UNITED STATES PATENT OFFICE.

BERTHA LEIBBRANDT, OF SANTA CRUZ, CALIFORNIA.

PROCESS OF TREATING GRAIN FOR BEVERAGES.

1,269,100.

Specification of Letters Patent. Patented June 11, 1918.

No Drawing. Application filed November 12, 1917. Serial No. 201,562.

*To all whom it may concern:*

Be it known that I, BERTHA LEIBBRANDT, a citizen of the United States, residing at Santa Cruz, in the county of Santa Cruz and State of California, have invented certain new and useful Improvements in Processes of Treating Grain for Beverages, of which the following is a specification.

This invention relates to an improved process of preparing a beverage from wheat grain, and has for its primary object to process or treat whole wheat grain in such manner that a beverage of excellent flavor, simulating coffee, may be prepared.

It is a further object of the invention to provide a process whereby practically all of the food value of the grain is retained and which, when used for the production of a beverage, will impart thereto an excellent flavor and will also materially aid digestion.

It is a further additional object of the invention to provide a process for preparing what may aptly be designated germinated wheat coffee and in the use of which material economy will be realized in comparison with the expense incident to the use of the coffee bean.

With the above and other objects in view, the invention consists in the several process steps which I shall now more particularly set forth.

Selected whole wheat grains are first washed and softened in a temperature of 80° Fr. until the grain begins to germinate. The grain is then thoroughly moistened and placed in air-tight cans or receptacles. These cans are then subjected to a high heat, preferably steam heat, at a temperature of 220° Fr. for six hours. The grain is thus thoroughly cooked and becomes mellow throughout.

The grain is now removed from the cans or receptacles and is dried in a mild heat until all of the moisture is evaporated and the grain again becomes hardened. The grain processed in this manner to cause germination thereof, is finally slightly roasted until the sugar in the grain is developed. This roasting of the grain should be only sufficient to develop the sugar therein and care should be taken to avoid subjecting the grain to an intense or excess heat, which would result in the destruction of the sugar constituent thereof.

In the preparation of the coffee or beverage from the roasted germinated wheat produced in the manner above explained, one teaspoonful of the ground grain is used to each pint of water and the beverage is prepared by boiling in the manner of the ordinary coffee made from the coffee bean.

Having thus fully described my invention, what I desire to claim and secure by Letters Patent is:

1. The herein described process of treating whole wheat grain which consists in first softening the grain in a temperature of substantially 80° Fr. until the grain begins to germinate; secondly, moistening the grain and subjecting it to a cooking heat for a period of approximately six hours until the grain becomes mellow; thirdly, drying the cooked grain in a mild heat until the moisture is evaporated and the grain becomes hardened; and finally, slightly roasting the germinated grain.

2. The herein described process of treating whole wheat grain for use in the production of a beverage, which consists first in softening the grain by the application of a relatively mild heat until the grain begins to germinate; secondly, steam cooking the grain in air-tight receptacles at a temperature of 220° Fr.; thirdly, drying the cooked grain in a mild heat until all moisture is evaporated and the grain is hardened; and finally, slightly roasting the hardened grain to develop the sugar therein.

In testimony whereof I hereunto affix my signature in the presence of two witnesses.

BERTHA LEIBBRANDT.

Witnesses:
ERNEST C. KRAMER,
GENEVA MCCORMICK.